United States Patent [19]

Gofflot

[11] 4,116,166

[45] Sep. 26, 1978

[54] AUTOMATIC CATTLE GATE ASSEMBLY

[76] Inventor: Armand Gofflot, R.R. #1, Pipestone, Canada

[21] Appl. No.: 739,492

[22] Filed: Nov. 8, 1976

[51] Int. Cl.² .......................... A61D 3/00; A01K 1/06

[52] U.S. Cl. ...................................................... 119/99

[58] Field of Search ...................... 119/98, 99, 103, 96

[56] References Cited

U.S. PATENT DOCUMENTS

| | | | |
|---|---|---|---|
| 583,357 | 5/1897 | Brown | 119/99 |
| 3,221,707 | 12/1965 | Pearson | 1/1998 |

*Primary Examiner*—Hugh R. Chamblee

*Attorney, Agent, or Firm*—Stanley G. Ade

[57] ABSTRACT

Conventional cattle gates in cattle chutes and the like are manually actuated by one operator when the head of an animal is in position and the animal is urged into the gate area by another operator. This is time consuming and often frightens and/or harms the animal. The present device does not operate until the animal's head is positioned correctly at which time the head triggers the mechanism which closes rapidly and gently around the animal's neck and holds the animal firmly for the necessary treatment such as de-horning, inoculation, blood tests and the like.

11 Claims, 11 Drawing Figures

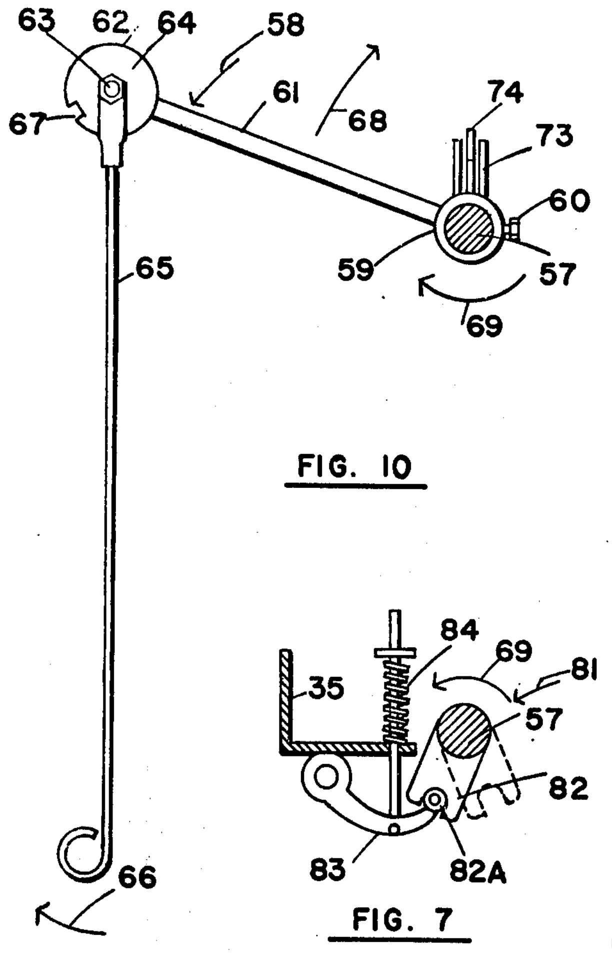
FIG. 10
FIG. 7
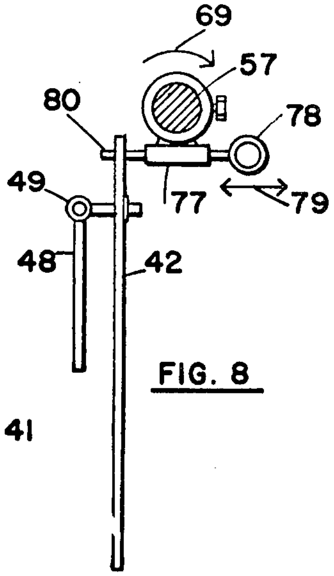
FIG. 8
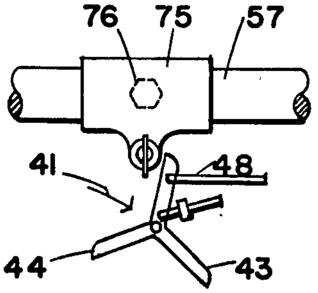
FIG. 9
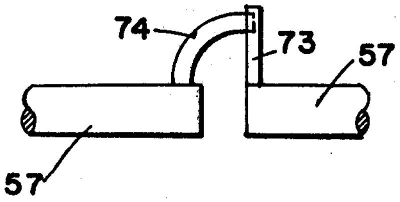
FIG. 11

AUTOMATIC CATTLE GATE ASSEMBLY

BACKGROUND OF THE INVENTION

This invention relates to new and useful improvements in cattle gate assemblies normally positioned at one end of a cattle chute and adapted to hold an animal around the neck area so that various treatments can be undertaken.

Conventionally, one operator urges the animal down a chute and when the head is positioned approximately between the gates, another operator manually closes the gates around the animal's neck. This is time consuming and often frightens the animal and of course requires at least two operators.

SUMMARY OF THE INVENTION

The present invention overcomes all of the disadvantages inherent with conventional cattle gates by providing a trigger mechanism which is actuated by the animal's head as it moves along the chute. This ensures that the gates close automatically around the animal's neck which is positioned correctly to receive the gates. This means that only one operator is required and that the animal is not frightened thus making it much easier to treat the animal.

The principal object and essence of the invention is therefore to provide a device of the character herewithin described which is automatically triggered by the animal's head as it passes through the chute whereby the gates close around the neck of the animal rapidly and gently thus holding the animal firmly in position.

Another object of the invention is to provide a device of the character herewithin described which includes quick release means thus enabling the animal to be freed and the gates opened once the necessary operation has been undertaken.

A still further object of the invention is to provide a device of the character herewithin described which is adjustable within limits to suit animals of various sizes.

A still further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 7 is an enlarged fragmentary cross sectional view along the line 7—7 of FIG. 3.

FIG. 8 is a fragmentary enlarged view substantially along the line 8—8 of FIG. 3.

FIG. 9 is a front elevation of FIG. 8.

FIG. 10 is an enlarged fragmentary cross sectional view substantially along the line 10—10 of FIG. 3.

FIG. 11 is an enlarged fragmentary front elevation of the junction between adjacent ends of the trigger rod per se.

In the drawings like characters of reference indicate corresponding parts in the different figures.

DETAILED DESCRIPTION

Figure 1:
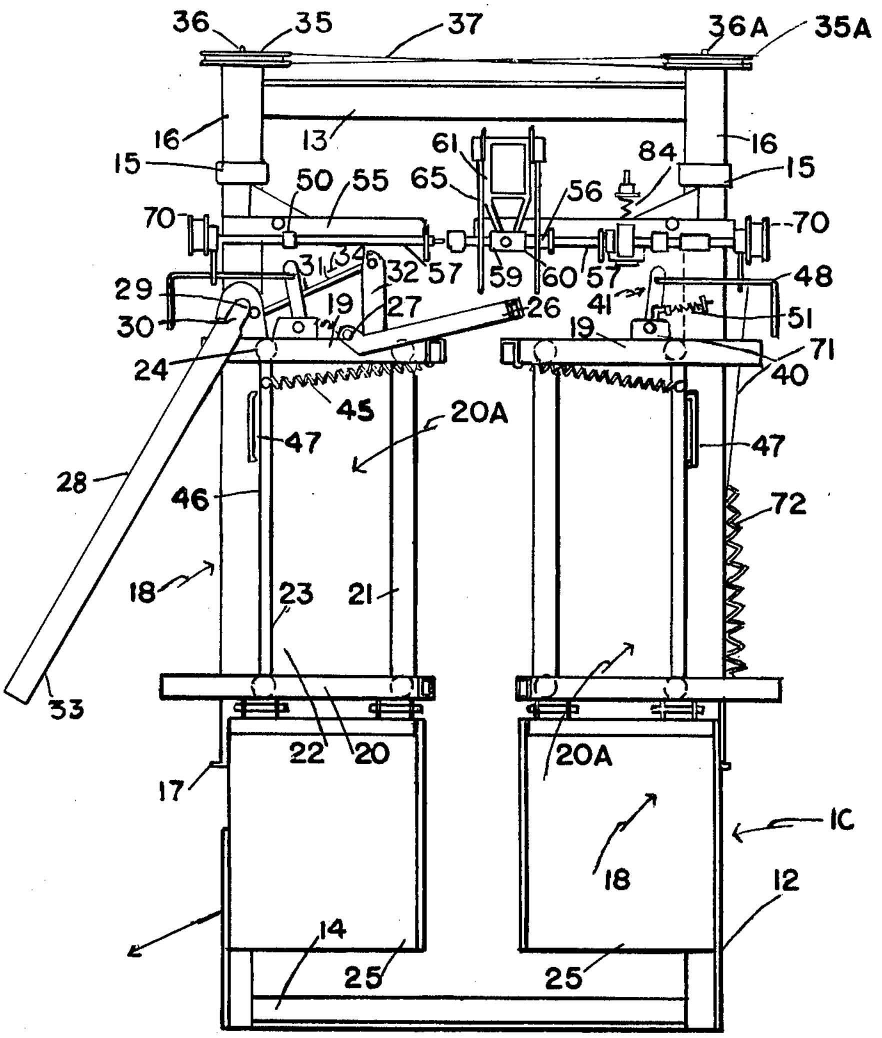
FIG. 1 is a front elevation of the gate assembly shown in the released position.
Figure 2:
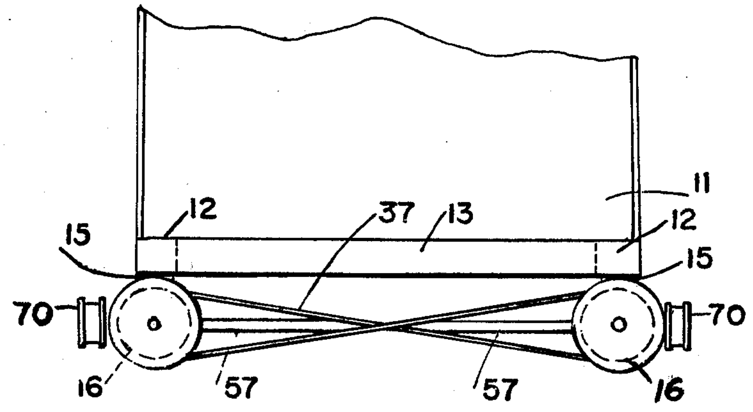
FIG. 2 is a partial top plan view of FIG. 1.

Proceeding therefore to describe the invention in detail, reference character 10 illustrates generally, supporting structure. In this embodiment, one end 11 of the conventional chute (not illustrated) includes a head frame consisting of a pair of uprights 12 in spaced and parallel relationship with an upper cross member 13 extending between adjacent upper ends thereof and a lower cross member 14 extending between the lower ends thereof.

Sleeve bearing assemblies 15 extend from each of the upright members 12 adjacent the upper ends thereof and receive vertically situated tubular supports 16 for partial rotation therein. Bearing plates 17 extend outwardly from the upright members 12 spaced upwardly from the lower ends thereof and bearably support the lower ends of these tubular members 16. These tubular members form part of a pair of gate assemblies collectively designated 18 which are adapted to engage across the one end of the chute and to hold an animal by the neck firmly therein.

Although in the preferred and present embodiment, both gate assemblies are similar, nevertheless it will be appreciated that one gate assembly could be fixed if desired with the other moving towards and away from the fixed gate assembly in order to hold the animal firmly.

Each gate assembly 18, includes upper and lower gate channel members 19 and 20 secured by one end thereof to the tubular members 16 and extending therefrom in spaced and parallel relationship.

A gate collectively designated 20A includes an inner tubular member 21 by which the gate engages the neck of the animal, and a substantially rectangular panel 22 extending therefrom with a stiffener member 23 secured to the panel member.

Upper and lower rollers 24 are journalled for rotation adjacent the four corners of the gate 20A and engage within the upper and lower channel members 19 and 20 respectively thus enabling the gate to move sideways within the channels 19 and 20.

Hinged gate panels 25 are hingedly secured to the lower channels 20 and extend downwardly therefrom substantially closing off the lower portion of the end 11 of the chute when the gates are in the closed position illustrated in FIG. 1.

When in the closed position, a closure channel member 26 engages the upper channels 19 of the two gate assemblies and maintain them in the closed position. This channel member 26 is hinged to one of the channels 19 by means of pivot 27 and the channel engages over both of the channels 19 thus preventing swinging movement of the two gate assemblies.

An operating handle 28 is pivoted to one of the tubular members 16 by means of pivot pin 29 and is provided with a cam portion 30 to which a link 31 is pivotally secured by one end thereof. The other end of link 31 is pivotally secured to an upstanding lug 32 extending from the channel 26 inboard of the pivot point 27 thereof.

If the handle 28 is moved in the direction of arrow 33, the link 31 moves in the direction of arrow 34 thus lifting the locking channel 26 upwardly and clear of the other gate assembly so that the handle 28 can then be moved in a substantially horizontal plane in either direction thus swinging the one gate assembly inwardly or outwardly relative to the one end 11 of the chute.

Means are provided to initiate similar action of the other gate assembly and in this embodiment comprises a pulley 35 fixed upon a spindle 36 which in turn is secured within the upper end of the tubular member 16.

A similar pulley 35A is secured in a similar manner to the upper end of the other vertical tubular member 16. A crossed cable 37 extends around the pulleys 36 and 36A so that the swinging of the one gate assembly by means of the handle 28, initiates similar swinging action in the opposite gate assembly due to the crossed cable and pulley assembly hereinbefore described.

Each gate assembly is provided with a setting assembly collectively designated 38 which enables the gates to be set in the open position prior to an animal entering the chute.

Each setting assembly includes a serrated or rack formation 39 formed on the upper edge of each of the gates 20A and each upper gate channel 19 is provided with a small casing 40 on the upper surface thereof with the channel 19 being slotted through the upper surface within this casing 40.

A setting component collectively designated 41 is pivotally secured within the casing 40 and includes an actuating lever 42 extending upwardly through a slot in the casing 40 and a pair of rack engaging claws 43 and 44 formed on the lower end thereof as clearly shown in FIGS. 3 through 6.

Each gate is provided with a tension spring 45 extending between a point adjacent the inner ends of the gate channels 19 and the outer side 46 of the gates thus normally urging the gates towards the closed position.

Figure 5:
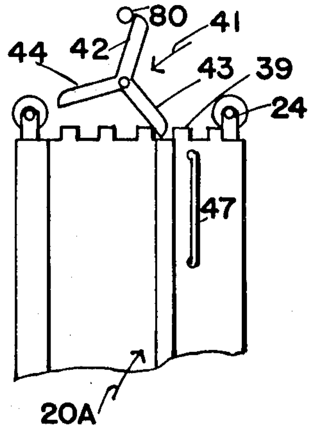
FIG. 5 is a view similar to FIG. 4 but in the set position.
Figure 6:
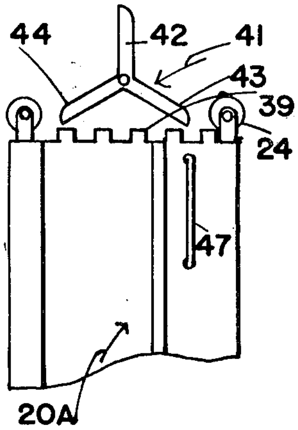
FIG. 6 is a view similar to FIGS. 4 and 5 but in the "free" position.

If the component 41 is positioned as illustrated in FIG. 6, the rack engaging claws 43 and 44 are clear of the rack teeth 39 so that the gates can be opened manually against the spring pressure, handles 47 being provided for this purpose. When the gates have been opened the desired amount, claw 43 is engaged within the rack teeth thus holding the gates in position illustrated in FIG. 5 against tension of spring 45.

Figure 4:
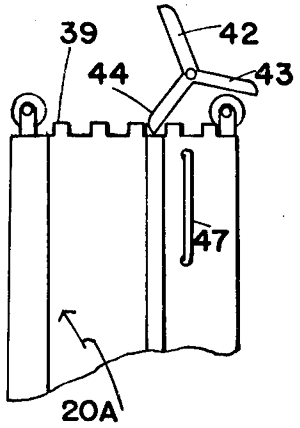
FIG. 4 is a partially schematic view of one of the gates in the released and locked position.

If the component 41 is released by moving it to the position shown in FIG. 4, then the springs close the gates towards one another with the claw 44 having a ratchet action which enables the gates to close but prevents them from opening until the component 41 is moved to the released position shown in FIG. 6.

A lever rod 48 is supported within a support bracket 49 for movement in the direction of double headed arrow 50 (see FIG. 3), and the inner end of this lever rod is pivotally secured to adjacent the upper end of the actuating portion 42 of the component 41.

A compression spring 51 surrounds a spring rod 52 guided by a bracket 53. This rod is pivotally secured to the actuating portion 42 of the component 41 below the point of pivotal connection of the lever rod 48. Spring 51 normally urges the component 41 to the position illustrated in FIG. 4 whereas the lever 48 is utilized to manually move the component 41 firstly to the position shown in FIG. 6 and secondly, to the position shown in FIG. 5 as will hereinafter be described.

A trigger assembly is provided collectively designated 54. It consists of a pair of angle iron supports 55 welded to the tubular member 16 and extending inwardly therefrom spaced and parallel above the upper gate channels 19.

Each angle iron support 55 is provided with sleeve bearings 56 which in turn support for rotation, a rod 57.

A trigger component is provided collectively designated 58 and comprises a sleeve 59 secured to one of the rod portions 57 by means of a set screw 60.

A rigid frame 61 is secured to the sleeve 59 and extends therefrom and terminates within a pivot assembly 62 which includes a pivot pin 63 and a pair of discs 64 one on each end of the pivot pin 63.

A stiff wire trigger 65 is pivoted by the inner ends thereof to the pivot pin 63 and normally depends downwardly when in the "set" position as shown in FIG. 10. If this stiff wire trigger 65 is moved in the direction of arrow 66, as by being engaged by the head of an animal extending through the gates 20A, then the upper ends of this wire trigger will strike projections 67 on discs 64 and cause the portion 61 to rotate in the direction of arrow 68 thus rotating the rod 57 in the direction of arrow 69.

A pulley 70 is mounted upon the outer ends of each of the rods 57 and a wire cable or the like 71 is engaged around this pulley and depends downwardly therefrom to be connected to a tension spring 72 which in turn is anchored to the tubular supports 16. When the trigger assembly is in the set position as shown in FIG. 10, springs 72 are extended and when the trigger assembly is released as will hereinafter be described, these springs 72 move the trigger assembly upwardly clear of the animal to the position shown in FIG. 1 with the stiff wire portion 65 folding rearwardly towards the rigid portion 61.

Conversely when the device is set as will hereinafter be described, the stiff wire portion 65 takes up the vertical position due to gravity as illustrated in FIG. 10.

Means are provided to cause both rods 57 to rotate concurrently and in this connection, reference should be made to FIGS. 10 and 11. One rod 57 is provided with a pair of spaced and parallel lugs 73 on the inner end thereof whereas the other rod 57 is provided with an upwardly and inwardly curving horn lug 74 which normally engages between the lugs 73.

This means that rotation of one rod 57 will cause similar rotation of the other rod 57 but when they are in the position illustrated in FIG. 1, the gate assemblies can be swung open as the horn will disengage from between the lugs 73.

Figure 3:
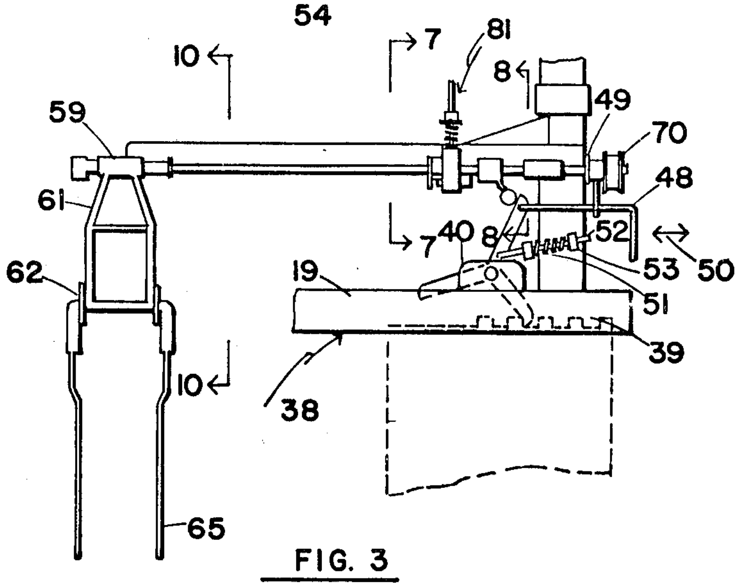
FIG. 3 is an enlarged fragmentary front elevation of one side of the trigger and release mechanism in the set position.

When the trigger assembly is in the position shown in FIGS. 3 and 10, means are provided cooperating between the trigger assembly and the setting assembly 38, to hold the setting assembly in the position illustrated in FIGS. 3 and 5, thus holding the gates in the open position against pressure of the gate springs 45.

A sleeve 75 (see FIGS. 8 and 9) is clamped to one of the rods 57 by means of clamp bolt 76 and a small guide bearing 77 is secured to the sleeve 75 and extends at right angles therefrom and upon the underside thereof. This bearing supports a pin 78 which can be moved in either direction as indicated by double headed arrow 79. When in the innermost position shown in FIGS. 8 and 9, the inner end 80 of this pin engages behind the actuating portion 42 of the component 41 thus holding it in the "set" position illustrated in FIG. 5. This pin is operated manually as follows.

Each gate assembly is moved to the desired open position when the component 41 is moved to the position shown in FIG. 6, by means of link rod 48 whereupon the component 41 is moved manually to the position shown in FIG. 5 and the pin 78 is moved inwardly to engage the upper end of the actuating portion 42 thus holding component 41 in the "locked" position against pressure of its spring 51.

At the same time a release component is engaged with the rods 57, said release component being collectively designated 81 and being shown in FIG. 7.

A small fork assembly 82 is secured to one of the rods 57 and depends downwardly therefrom. A roller 82A is journalled for rotation upon one end of a curved lever 83 which in turn is pivoted to the underside of one of the angle iron support 35 and this is normally urged upwardly by means of a compression spring 84 connected as clearly shown in FIG. 7.

The roller 82A is normally held within the fork 82 by the aforementioned spring 72 supplying torque to the rods 57 and by the spring 84 urging the portion 83 upwardly into engagement.

However, rotation of rod 57 will cause the roller to disengage from the fork 82 and will also cause the end 80 of the rod 78 to disengage from the upper end of the actuating portion 42 of the component 41.

In operation, the gates are placed in the position illustrated in FIG. 1 across the one end 11 of the chute and the handle 28 is lowered in the opposite direction to arrow 33 thus engaging the channel lock 26 over the upper channels 29 of the gate assemblies.

The trigger assembly is moved downwardly manually to the position shown in FIG. 10 thus rotating rods 57 in a direction opposite to arrow 69 and extending springs 72.

This causes the roller 82A to be engaged by the fork 82 thus setting the mechanism.

The portions 48 of each gate are then moved manually so that the components 41 are in the position shown in FIG. 6 whereupon the gates are opened individually against pressure of the gate springs 45, to the desired amount depending upon the size of the animal entering the chute.

When each gate is opened to the desired amount, the component 41 is moved by means of the portions 48, to the position shown in FIG. 5 whereupon the rod 78 is moved inwardly so that the inner end 80 engages behind the upper end of the actuating portion 42 thus holding the gates in the open position against pressure of the gate springs 45.

As the animal enters the chute, the animal's head passes between the inner sides of the open gates and strikes the stiff wire portion 65 of the trigger moving it in the direction of arrow 66 which, as hereinbefore described, rotates the rods 57 in the direction of arrow 69.

This disengages the roller 82A from the fork 82 thus allowing springs 72 to rotate the rods 57 to the position illustrated in FIG. 1 with the trigger assembly being moved clear of the animal's head completely.

At the same time the inner end 80 of the rod 78 has been cleared from the upper end of the actuating portions 42 thus allowing the component springs 51 to move the components to the position shown in FIG. 4.

The gates are moved inwardly to embrace the animal's neck with the components 41 acting as a ratchet with the rack teeth 39 and preventing the gates from moving outwardly so that the animal is held firmly and cannot release itself.

After the necessary treatment, the handle 28 is moved in the direction of arrow 33 thus releasing the locking channel 26 and permitting the operator to swing the gates inwardly or outwardly thus allowing the animal to pass through, cable 37 ensuring that both gates move the same amount and in the same direction as one another.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In conjunction with an animal chute and the like, a gate assembly situated at one end of the chute and adapted to hold the animal by the neck in position within the chute; said gate assembly comprising in combination supporting structure adjacent said one end of said chute, a pair of neck engaging gates operatively mounted to said supporting structure, at least one of said neck engaging gates being mounted for sideways movement across part of said one end of said chute, means to mount said one gate on said supporting structure for said sideways movement, said last mentioned means including spring means normally urging said one gate from an open position to a closed position, and trigger means situated adjacent said one end of said chute operatively connected to said one gate and normally retaining said one gate in the open position against pressure of said spring means, said trigger means adapted to be engaged by the head of an associated animal in said chute thereby releasing said trigger means whereby said spring means moves said one gate from said open position towards said closed position, means mounting said gates upon said supporting structure for selective partial rotation in either direction relative to said supporting structure for quick release of the associated animal, means normally retaining said gates in a plane substantially at right angles to the longitudinal axis of said chute, and means mounting the other of said gate for selective sideways movement across said chute and positioning said gates in any one of several positions relative to said chute.

2. The gate assembly according to claim 1 in which said means to mount said one gate for sideways movement across said chute includes upper and lower horizontal gate channel members secured adjacent one end thereof to said supporting structure, bearing means mounting said one gate for said sideways movement within said gate channel members, said supporting structure including a vertical support for each gate journalled for partial rotation about a vertical axis, said vertical supports being mounted for partial rotation upon said one end of said chute.

3. A gate assembly according to claim 1 in which said trigger means includes an animal head engaging trigger normally situated between the inner ends of said gates, means mounting said trigger for pivotal movement, a trigger latch on said last mentioned means, said trigger latch normally engaging said one gate and holding same in the open position against pressure of said spring means, and ratchet means operatively connected to said one gate and engageable by said one gate as same moves to the closed position when said trigger is actuated whereby said one gate is restrained from movement towards the open position.

4. In conjunction with an animal chute and the like, a gate assembly situated at one end of the chute and adapted to hold the animal by the neck in position within the chute; said gate assembly comprising in combination supporting structure adjacent said one end of said chute, a pair of neck engaging gates operatively mounted to said supporting structure, at least one of said neck engaging gates being mounted for sideways movement across part of said one end of said chute, means to mount said one gate on said supporting structure for said sideways movement, said last mentioned means including spring means normally urging said one gate from an open position to a closed position, and trigger means situated adjacent said one end of said chute operatively connected to said one gate and normally retaining said one gate in the open position against pressure of said spring means, said trigger means adapted to be engaged by the head of an associated animal in said chute thereby releasing said trigger means whereby said spring means moves said one gate from said open position towards said closed position, said means to mount said one gate for sideways movement across said chute including upper and lower horizontal gate channel members secured adjacent one end thereof to said supporting structure, bearing means mounting said one gate for said sideways movement within said gate channel members, said supporting structure including a vertical support for each gate journalled for partial rotation about a vertical axis, said vertical supports being mounted for partial rotation upon said one end of said chute.

5. The gate assembly according to claim 4 which includes means mounting the other of said gate for selective sideways movement across said chute and positioning said gates in any one of several positions relative to said chute.

6. The gate assembly according to claim 4 which includes means mounting said gates upon said supporting structure for selective partial rotation in either direction relative to said supporting structure for quick release of the associated animal, and means normally retaining said gates in a plane substantially at right angles to the longitudinal axis of said chute.

7. The gate assembly according to claim 6 which includes means mounting the other of said gate for selective sideways movement across said chute and positioning said gates in any one of several positions relative to said chute.

8. In conjunction with an animal chute and the like, a gate assembly situated at one end of the chute and adapted to hold the animal by the neck in position within the chute; said gate assembly comprising in combination supporting structure adjacent said one end of said chute, a pair of neck engaging gates operatively mounted to said supporting structure, at least one of said neck engaging gates being mounted for sideways movement across part of said one end of said chute, means to mount said one gate on said supporting structure for said sideways movement, said last mentioned means including spring means normally urging said one gate from an open position to a closed position, and trigger means situated adjacent said one end of said chute operatively connected to said one gate and normally retaining said one gate in the open position against pressure of said spring means, said trigger means adapted to be engaged by the head of an associated animal in said chute thereby releasing said trigger means whereby said spring means moves said one gate from said open position towards said closed position, including an animal head engaging trigger normally situated between the inner ends of said gates, means mounting said trigger for pivotal movement, a trigger latch on said last mentioned means, said trigger latch normally engaging said one gate and holding same in the open position against pressure of said spring means, and ratchet means operatively connected to said one gate and engageable by said one gate as same moves to the closed position when said trigger is actuated whereby said one gate is restrained from movement towards the open position.

9. A gate assembly according to claim 8 which includes means mounting the other of said gate for selective sideways movement across said chute and positioning said gates in any one of several positions relative to said chute.

10. A gate assembly according to claim 8 which includes means mounting said gates upon said supporting structure for selective partial rotation in either direction relative to said supporting structure for quick release of the associated animal, and means normally retaining said gates in a plane substantially at right angles to the longitudinal axis of said chute.

11. A gate assembly according to claim 10 which inincludes means mounting the other of said gate for selective sideways movement across said chute and positioning said gates in any one of several positions relative to said chute.

* * * * *